United States Patent [19]

Mullin et al.

[11] Patent Number: 5,179,251

[45] Date of Patent: Jan. 12, 1993

[54] UNSHIELDED SERVICE WIRE FOR BURIED INSTALLATION

[75] Inventors: Francis J. Mullin, Chamblee, Ga.; Jim A. Rogers, Phoenix, Ariz.

[73] Assignee: AT&T Bell Laboratories, Murray Hill, N.J.

[21] Appl. No.: 545,324

[22] Filed: Jun. 27, 1990

[51] Int. Cl.$^5$ .................. H01B 7/28; H01B 11/02
[52] U.S. Cl. .................. 174/23 C; 174/117 R; 174/117 F; 174/131 A
[58] Field of Search ............ 174/23 R, 23 C, 113 C, 174/131 A, 41, 70 A, 117 F, 117 R

[56] References Cited

U.S. PATENT DOCUMENTS

| | | | |
|---|---|---|---|
| 2,729,696 | 1/1956 | Mapelsden et al. | 174/117 F |
| 4,326,094 | 4/1982 | Hunn | 174/23 R |
| 4,366,206 | 12/1982 | Tanaka | 428/373 |
| 4,425,475 | 1/1984 | Ward | 174/117 F |
| 4,467,138 | 8/1984 | Brorein | 174/115 |
| 4,723,831 | 2/1988 | Johnson et al. | 385/111 |
| 4,761,053 | 8/1988 | Cogelia et al. | 174/41 X |
| 4,815,813 | 3/1989 | Arroyo et al. | 174/23 C |
| 4,820,560 | 4/1989 | Buchwald et al. | 174/23 C X |
| 4,844,575 | 7/1989 | Kinard et al. | 174/23 C X |
| 4,874,219 | 10/1989 | Arroyo et al. | 385/107 |
| 4,909,592 | 3/1990 | Arroyo et al. | 174/23 C X |
| 5,010,210 | 4/1991 | Sidi et al. | 174/34 |

FOREIGN PATENT DOCUMENTS 10013477 7/1980 European Pat. Off.
1145243 3/1963 Fed. Rep. of Germany ... 174/117 R

OTHER PUBLICATIONS

"Rodent Biting Pressure and Chewing Action and Their Effects on Wire and Cable Sheath", Proceedings of 25th International Wire and Cable Symposium. Nov. 16-18, 1976, pp. 117-124.

Primary Examiner—Morris H. Nimmo
Attorney, Agent, or Firm—E. W. Somers

[57] ABSTRACT

An unshielded buried service wire (20) includes a core (22) and a jacket (40). The core comprises two pairs (24-24) of insulated metallic conductors (26-26). Also associated with each conductor pair is a longitudinally extending waterblocking member (33) which inhibits the flow of water longitudinally of the wire. The jacket has a transverse cross sectional configuration which is generally oval. Adjacent to each of opposed small radius of curvature portions of the service wire and embedded substantially in the jacket is a longitudinally extending, rod-like strength member (50) which is caused to adhere to plastic material of the jacket.

14 Claims, 1 Drawing Sheet

UNSHIELDED SERVICE WIRE FOR BURIED INSTALLATION

TECHNICAL FIELD

This invention relates to an unshielded service wire for buried installation. More particularly, this invention relates to an unshielded service wire which includes pairs of twisted metallic conductors, waterblocking provisions and strength members.

BACKGROUND OF THE INVENTION

In order to provide communications service to a customer, it is commonplace to extend a small pair size metallic conductor cable or service wire, as it is called, from a distribution cable to the customer's premises. The demand for such service wires seemingly has not abated notwithstanding increasing amounts of activity to provide optical fiber to the home.

Such a service medium must meet several requirements. Inasmuch as it has one end thereof adjacent to the customer's premises, it must be flame retardant. Further, it must have suitable mechanical strength to withstand the rigors of installation when it is plowed into the ground and to be able to resist compressive forces imparted to the cable during the installation stage and during its use. Typically, a plow used for installation has a vibratory cutting block which is referred to as a plow share. As the plow share is vibrated, the cable or wire is moved through a tube attached to the blade and into a trench along a curved path having a sharp radius such as several inches, for example.

Also, because the service wire is buried, it is required to include waterblocking provisions. These are required to prevent the longitudinal flow of water along the service wire to connection points. Typically, this has been accomplished in these kinds of wires by using a waterblocking, grease-like, filling composition of matter. This last-mentioned material is intended to fill interstices among conductors of a core.

A typical prior art service wire used in buried applications includes copper conductors having a filling material disposed thereabout and being enclosed by a dielectric core wrap material. A filling material is provided over the core wrap and is enclosed by a metallic shield having a longitudinal overlapped seam and a plastic jacket. Typically, the metallic shield is bronze. One commonly used service wire has an outer diameter of about 0.69 cm.

As far as strength properties are concerned, it has been commonplace to provide such a service wire with a metallic shield. The shield which also may be made of steel, for example, provides the requisite tensile strength and also functions to dissipate electromagnetic energy. Disadvantageously, shields have the effect of reducing manufacturing line speeds. Further, a shield must be electrically bonded or grounded with any one of a number of commercially available grounding clamps at the customer end and at the distribution cable end. Bonding of connection devices to the shield is time consuming. Because of the presence of the shield, there is a greater likelihood of a lightning strike with it than without it. Still further, a shield increases considerably the capacitance of the service medium. Also, as a shielded wire is handled and plowed into the ground, overlapping longitudinal edge portions of the shield may project into the plastic jacket which may cause the jacket to rupture.

Communications cables or wires which are strung between poles or those which are buried in the ground may be subjected to abuse such as, for example, attack by animals, mechanical abrasion and crushing. Attacks by gophers on buried cable and wire and by squirrels on aerial cable have been a continuing concern in some areas of the country. An excellent discussion of the problem of animal attack was presented at the 25th International Wire and Cable Symposium. A written version of that presentation appears beginning at page 117 in the proceedings of that conference, being authored by N. J. Cogelia, G. R. LaVoie, and J. G. Glahn and being entitled "Rodent Biting Pressure and Chewing Action and Their Effects on Wire and Cable Sheath". It has been found that an effective way to protect directly exposed cables from rodent attack is to wrap them in a metallic shield. See also U.S. Pat. No. 4,874,219 which issued on Oct. 17, 1989 in the names of C. J. Arroyo and P. D. Patel. However, the inclusion of a metallic shield restricts the manufacturing line speed, as pointed out hereinbefore and, of course, adds to the cost of the product.

Certainly, any new service wire must be designed with rodent protection being considered. However, what also is known is that these kinds of service wires are attacked by rodents only in well defined geographical areas of the United States and foreign lands. As a result, wires which may require a shield to provide protection against rodents may not need to be used as a universal service distribution wire in other areas of the United States and abroad.

One commercially available service wire is manufactured without a shield but with a circular configuration with strength members numbering on the order of about eight being embedded in the jacket. A grease-like filling material fills the core of this cable. Craftspersons in the field are not overly fond of the use of such materials because of housekeeping problems encountered during installation such as during splicing.

What is needed and what seemingly is not provided in the prior art is a service wire which is suitable for buried use in providing service to a customer. The sought-after service wire should have suitable flame retardancy and waterblocking provisions other than grease-like filling materials. Further, it must be relatively economical to manufacture.

SUMMARY OF THE INVENTION

The foregoing problems associated with prior art buried service wires have been overcome with the buried service wire of this invention. An unshielded service distribution wire, that is suitable for use in a buried environment, comprises a core having a longitudinal axis and comprising at least one pair of insulated metallic conductors which are twisted together and which extend longitudinally. A longitudinally extending waterblocking member is disposed adjacent to and associated with each said pair of longitudinally extending insulated metallic conductors. A jacket which is made of a plastic material and which has an oval-shaped cross section transverse to the longitudinal axis of the core encloses the core. The jacket cross section is defined by a major axis and a minor axis. The portion of the periphery of the jacket in the transverse cross section at and adjacent to the intersection with the major axis has a relatively small radius of curvature whereas at and adjacent to the intersection with the minor axis, the jacket has a relatively large radius of curvature. The jacket material engages the waterblocking member and portions of the insulated metallic conductors. Two longitudinally extending strength members are embedded in the jacket, each being disposed adjacent to the intersection of the major axis with the outer periphery of the jacket.

The buried service wire of this invention is relatively low in cost, has excellent mechanical properties and includes waterblocking provisions which are acceptable to craftspeople.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
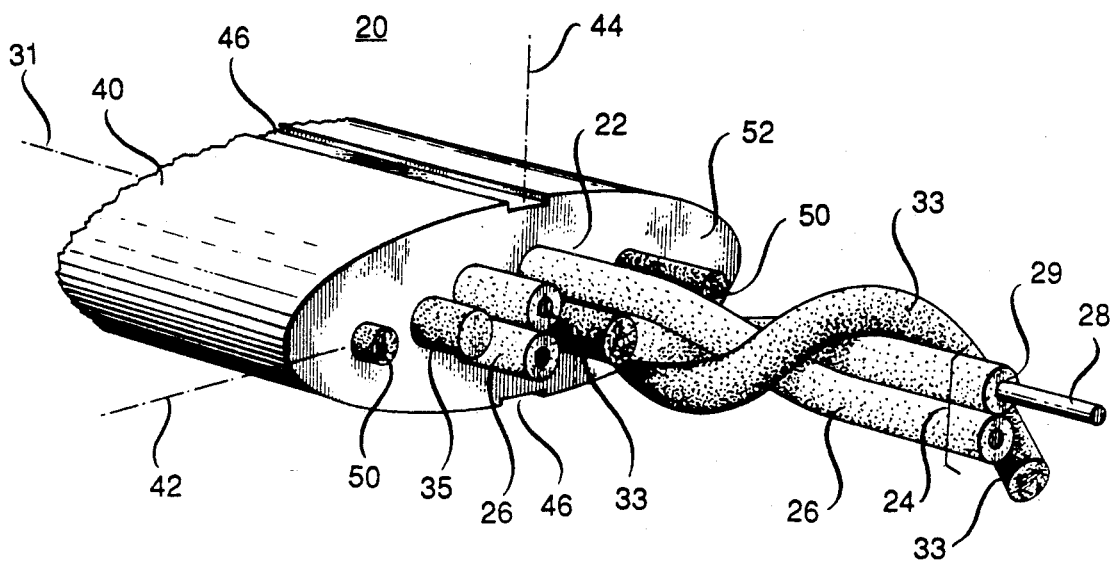
FIG. 1 is a perspective view of an end portion of a buried service wire of this invention having an oval-shaped jacket.

Referring now to FIG. 1, there is shown a buried, unshielded service distribution wire of this invention which is designated generally by the numeral 20. The service wire 20 is suitable for underground use to bring service from a distribution point to a customer's premises.

As shown in the drawing, the service wire 20 includes a core 22 which includes transmission media. The transmission media includes at least one pair 24 of insulated metallic conductors 26—26. Each insulated metallic conductor 26 includes a metallic conductor 28 such as a copper wire, for example, and an insulative cover 29. Further, the two insulated conductors of each pair 24 are twisted together and extend longitudinally in the direction of a longitudinal axis 31 of the service wire 20. In a preferred embodiment, the service wire 20 includes two twisted pairs of insulated metallic conductors. Further each conductor preferably is a 22 gauge copper conductor and is insulated with a polyethylene plastic material.

Inasmuch as the service wire 20 is suitable for use in buried installations, the service wire must have provisions for inhibiting the longitudinal flow of water along the length of the wire from a point of entry. In order to provide this capability, each twisted pair of insulated metallic conductors has a waterblocking member 33 associated therewith. In the preferred embodiment, a waterblocking member 33 is wrapped helically about each conductor pair. A suitable waterblocking member may comprise a yarn which has been impregnated with a superabsorbent material. Such a waterblocking member is disclosed in U.S. Pat. No. 4,815,813 which issued on Mar. 28, 1989 in the names of C. J. Arroyo, P. Debban and W. Paucke and which is incorporated by reference hereinto. Also, in U.S. Pat. No. 4,815,813 are disclosed superabsorbent materials which may be used to treat yarns or strips.

In a preferred embodiment, the waterblocking member is a yarn 33 such as a 5 denier yarn, for example, which has been treated with a water swellable material. Such a yarn is disclosed in U.S. Pat. No. 4,366,206 which is incorporated by reference hereinto. Yarn suitable for use in a cable 20 is manufactured by Japan Exlan Co., Ltd. of Osaka, Japan, under the trade designation "LANSEAL-F" super absorbent fiber and is available commercially from Chori America, Inc.

In order to supplement the waterblocking capability of the service wire 20, the service wire of the preferred embodiment is provided with another waterblocking member 35 which also may comprise a yarn impregnated with a superabsorbent material. The additional waterblocking member 35 is not associated with any metallic conductor pair but rather extends longitudinally, generally parallel to the axis 31.

Referring again to the drawing, it can be seen that the core 22 is enclosed in a jacket 40. The jacket 40 comprises a plastic material which is suitably flame-retardant and which in a preferred embodiment is polyvinyl chloride.

Also as can be observed in the drawing, the jacket 40 is such that a cross section thereof which is normal to the longitudinal axis 31 has an oval-shaped configuration. That cross section has a major axis 42 which is parallel to an x axis and a minor axis 44 which is parallel to the y axis. As is evident from FIG. 1, the outer periphery of the jacket at and adjacent to its intersection with the major axis is characterized by a relatively small radius of curvature whereas at and adjacent to its intersection with the minor axis, it is characterized by a relatively large radius of curvature. Typically, the outer dimension of the jacket as measured along the minor axis is about 0.69 cm. and along the major axis is about 0.91 cm.

Figure 2:
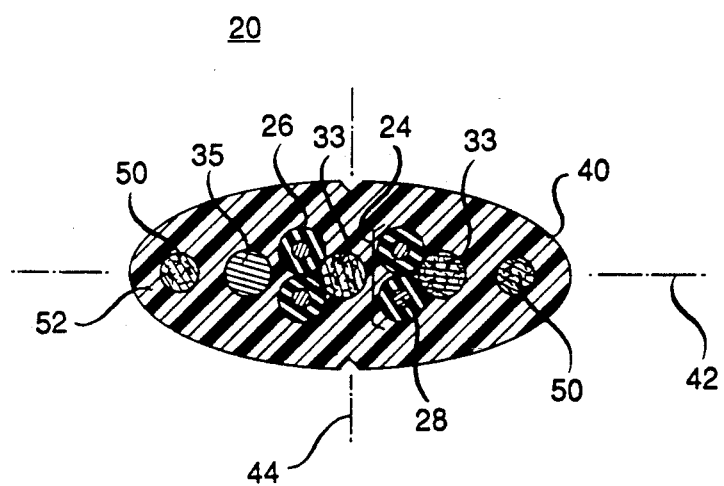
FIG. 2 is an end sectional view of an alternative embodiment of the buried service wire.

In order to facilitate removal of the jacket for purposes of connection, the jacket 40 is provided with two oppositely disposed notches 46-46 at the intersection of the minor axis and the outer periphery of the wire 20. Although the notches 46-46 may have a rectangular cross section in the oval-shaped cross section of the wire, the notches may be triangularly shaped (see FIG. 2). The notches serve as a guide for a knife used by a craftsperson to cut into the jacket.

The service wire 20 of this invention does not include a metallic shield as has been customary in prior art buried service wires. Because of the absence of the shield, the plastic material of the jacket 40 engages the waterblocking members 33—33 and portions of the periphery of each insulated metallic conductor in the core 22. Also, portions of the plastic material of the jacket 40 extend at least toward tangency points between adjacent conductors of a pair and possibly into interstices between the conductors of a pair and/or between adjacent pairs and between a pair of conductors and its associated waterblocking member.

Because of the absence of a metallic shield, the service wire 20 must include a suitable strength member system. As seen in the drawing, the service wire 20 includes two longitudinally extending strength members 50—50, each being disposed generally along the major axis 42 between the core 22 and an outwardly facing surface of the jacket 40. At each small radius of curvature portion 52 of the jacket 40, each strength member is enclosed by a minimum amount of plastic material which is sufficient to prevent breakout of the strength members. Rather than have a rectangular or square cross section, the cross section of the service wire 20 is oval-shaped. Two quadrants of covering jacket material for each strength member are substantially uniform in thickness whereas for a rectangular cross section, end covering thickness would most likely be exceeded by those in a y axis direction. As a result of the arrangement of this invention, substantial amounts of jacketing material are saved.

The strength members 50—50 are positioned so as to be covered by sufficient plastic material to prevent their breakout, not only externally but also internally. The strength members are arranged so that they do not engage the conductors. There is a minimum distance between each strength member 50 and a waterblocking member or conductor of the core to insure that substantially all of the periphery of each strength member is enclosed by the plastic material of the jacket. As a result, the service wire has suitable mechanical properties to exhibit a minimum breaking strength of 150 lbs.

Each strength member in the preferred embodiment comprises a filamentary, yarn-like material. In a preferred embodiment, the strength members are comprised of a plurality of E-glass fibers. E-glass fibers comprise a borosilicate glass composition, with the fibers having a minimum tensile strength of 200,000 psi. In an exemplary preferred embodiment, each strength member comprises rovings, each roving comprising about 2,000 fibers. Although the strength member cross section may be substantially circular as shown in FIG. 1, non-circular, e.g., oval-like, strength members may be used.

The strength members 50—50 must have suitable strength characteristics to prevent tensile load failure. Tensile load failure is caused by abrasion, flaws and tensile load imbalance. Filaments of a strength member may be abraded by neighboring filaments in the environment of use and by particles in a subsequently extruded jacket. Such abrasion may become most severe under some conditions. Flaws occur with the probability that increases with the filament length and cause tensile load failures in a length of time which is approximately inversely proportional to the cable length. Uneven sharing of the tensile load results when the filaments are not coupled to share the tensile loads evenly. As some filaments break, others accept the load until the total cross section of the strength member fails.

To avoid these potential problems, impregnated rovings or yarns are used in the preferred embodiment as strength members. Coupling of the strength members to the jacket, and resistance to failure of the strength members under load, are both enhanced by suitable impregnation of the filaments. Impregnating material coats each filament with a layer which protects against abrasion and couples each filament to its neighbor to bridge flaws and establish tensile load balance.

The strength members typically are impregnated with a material that promotes coupling to the jacket and that exhibits a relatively high coefficient of static friction with the material of the jacket. Coupling to the jacket inhibits the formation of longitudinal paths between the outer surfaces of the strength members and the jacket material along which water could travel.

Impregnating material may be formed by condensation or addition polymerization reactions and may include, for example, urethanes, acrylic acid or acrylate-based materials, epoxies, polyesters, and polyvinyl chloride or other vinyl based materials. For strength member materials such as fiberglass, a coupling agent or sizing such as silane is used to couple the impregnating material to the filaments; for material such as aramid fiber, a coupling agent may not be required. However, although aramid fiber is very suitable for use as the strength member, such material is relatively expensive. For an example of a method of impregnating a bundle of filaments, see U.S. Pat. No. 4,479,984 which issued on Oct. 30, 1984 in the names of N. Levy and P. D. Patel.

Impregnating roving or yarn overcomes a disadvantage of plain roving or yarn for the strength members. Unlike plain roving or yarn, any flaws in any of the filaments are bridged by the impregnating material which also prevents abrasion. Impregnation increases the flex life of the completed structure over that of unimpregnated roving. The impregnating material also serves as part of the waterblocking system for the cable.

A significant aspect of the preferred embodiment of the invention is the number and placement of strength members. It should be observed that the two portions of the strength member system are arranged in a particular fashion with respect to the core 22. They are arranged so as to be diametrically opposite to each other and to fall along the transverse axis of symmetry, i.e. the major axis 42. As a result, the cable has a preferred plane of bending which extends through the strength members. This arrangement avoids excess tension or compression on the strength members when the service wire is bent in the preferred plane of bending. Also, this arrangement causes the service wire to have enhanced flexibility.

The service wires of this invention are advantageous from several standpoints. There is no filling material. The absence of a filling material makes the cables user friendly. The waterblocking yarns are effective to prevent the longitudinal flow of water. Further, there is no shield which avoids problems of forming a metallic tape about the core. Also, the absence of a shield results in easier terminations and obviates the need for the use of bonding clamps to ground the shield. Still further, it has been found that many times the shields have crushed or broken, thereby compromising the strength properties of the cable. Tests have shown that the crush resistance of the service wires of this invention is better than that of a shielded distribution service wire. Also, there is no metal to kink or pinch the service wire as the wire is wound in convolutions on a reel or unwound therefrom for installation.

As for rodent production, special precautions may need to be taken in those areas in which rodents are prevalent. However, for most areas the buried unshielded service wire of this invention is deemed to be satisfactory.

It is to be understood that the above-described arrangements are simply illustrative of the invention. Other arrangements may be devised by those skilled in the art which will embody the principles of the invention and fall within the spirit and scope thereof.

We claim:

1. An unshielded service wire which is suitable for use in a buried environment, said service wire comprising:

a core which has a longitudinal axis and which comprises at least one pair of insulated metallic conductors which are twisted together and which extend longitudinally;

a longitudinally extending waterblocking member which is associated individually with said at least one pair of longitudinally extending metallic conductors; and a longitudinally extending waterblocking member disposed adjacent to said at least one pair of longitudinally extending insulated metallic conductors;

a jacket which is made of a plastic material and which has an oval-shaped cross section transverse to said longitudinal axis of said core with the oval-shaped cross section having a major axis and a minor axis which is normal to the major axis;

said plastic material of said jacket engaging each waterblocking member and portions of said insulated metallic conductors; and two longitudinally extending strength members embedded substantially in said jacket with each strength member being disposed adjacent to an intersection of said major axis and an outer periphery of said jacket cross section.

2. The service wire of claim 1, wherein said jacket plastic material comprises polyvinyl chloride.

3. The service wire of claim 1, wherein said strength members each comprise a fiberglass material.

4. The service wire of claim 1, wherein each said strength member is yarn-like and is impregnated with a resinous material.

5. The service wire claim 1, wherein each said strength member comprises a yarn-like material which has been treated with a material which causes said each strength member to become suitably adhered to said jacket.

6. The service wire of claim 1, wherein each said waterblocking member comprises a fibrous material.

7. The service wire of claim 6, wherein each said waterblocking member comprises a fibrous material which has been impregnated with a superabsorbent material.

8. The service wire of claim 7, wherein said waterblocking member which is associated individually with said at least one pair of longitudinally extending metallic conductors is wrapped about said associated pair of metallic conductors and extends longitudinally therewith.

9. The service wire of claim 1, wherein said jacket is provided with a notch generally at each intersection of said minor axis with an outwardly facing surface of said jacket.

10. The service wire of claim 9, wherein each said notch has a cross sectional configuration in the oval-shaped cross section of said jacket which is substantially rectangular.

11. The service wire of claim 9, wherein each said notch has a cross sectional configuration in the oval-shaped cross section which is V-shaped.

12. The service wire of claim 1, wherein each of said longitudinally extending strength members is disposed generally along said major axis of said oval-shaped cross section.

13. The service wire of claim 12, wherein each said longitudinally extending strength member is disposed adjacent a small radius of curvature portion of said oval-shaped jacket such that a substantial portion of the periphery of said each strength member is covered by a substantially uniform thickness of jacket material.

14. The service wire of claim 12, wherein each said strength member is disposed along said major axis to cause said each strength member and the nearest portion of said core to be spaced such that substantially all of the periphery of each said strength member is enclosed by the plastic material of the jacket.

* * * * *